United States Patent

[11] 3,564,988

[72] Inventor Harry S. Jones
    Monmouth Beach, N.J.
[21] Appl. No. 649,310
[22] Filed June 27, 1967
[45] Patented Feb. 23, 1971
[73] Assignee Chrom-Tronics, Inc.
    New York, N.Y.

[54] RELATIVE MOTION CAMERA CONSTRUCTION FOR 3-D PHOTOGRAPHY
    1 Claim, 2 Drawing Figs.
[52] U.S. Cl. .................................................. 95/18
[51] Int. Cl. .................................................. G03b 35/04
[50] Field of Search .................................................. 95/15, 18

[56] References Cited
    UNITED STATES PATENTS
    2,566,110  8/1951  Backus ................ 95/18P
    2,644,382  7/1953  Ayres ................. 95/18P
    FOREIGN PATENTS
    639,122    6/1950  Great Britain ........ 95/18

Primary Examiner—John M. Horan
Attorneys—Albert C. Johnston, Robert E. Isner, Lewis H. Eslinger and Alvin Sinderbrand ABSTRACT: Method and apparatus for directly securing normal three dimensional photographic images wherein the aperture of a relatively large lens is traversed by an auxiliary scanning aperture coincident with effecting relative displacement between the subject to be photographed and the camera to effect deposition of the scanned images on a photosensitive film through a multiple-element lens overlay adjacent thereto.

PATENTED FEB 23 1971　3,564,988

INVENTOR
HARRY S. JONES
BY
ATTORNEY.

RELATIVE MOTION CAMERA CONSTRUCTION FOR 3-D PHOTOGRAPHY

This invention relates to relief photography and more particularly to an improved construction for directly securing normal relief photographic images.

The obtaining of relief or three-dimensional images or effects in the photographic arts has, for many years, challenged the skilled workers in this field. While the basic theory and the nature of the problems involved have long been known and understood, the present day dearth of simple, commercially practical and inexpensive relief photographs and methods of obtaining the same cogently demonstrate the continued inability of the art to economically solve the problems involved.

The prior efforts in this field reveal both simple and complicated systems having various advantages and limitations and such are conveniently divisible into three broad general classes. The first of these involves the taking of two photographs of a subject using one or two camera lenses located at two different positions relative to the subject. Such photographs are usually referred to as a stereo pair. The second class obtains the relief effect essentially by the taking, through a single camera lens of small aperture, of a continuous series of photographs of the subject, as viewed from a continuous series of positions relative to the camera lens and recording the series through an array of very small auxiliary lenses or apertures located intermediate the lens and the photographic film plane so that an image of the single lens aperture is focused upon the film by each of such auxiliary lenses or apertures. The third broad class involves the use of a single camera lens, usually of large diameter, in association with a grating or lenticular system disposed intermediate the objective and the film plane.

Simple forms of the first class of apparatus delineated above involve old and well known techniques and had their genesis in the familiar "stereoscope". The second class of apparatus, although comprehensively disclosed in the patented art, has not as yet been widely used due to the bulk and complexity of the apparatus necessary to provide the requisite relative movement between the camera and the subject. Apparatus useable in the third category or system avoids the problems inherent in the provision and control of relative motion, however, the previously existing forms of such apparatus require the inclusion of complicated and usually expensive means of limited effectiveness in order to correct the abnormal relief images obtained with such apparatus.

This invention may be briefly described as an improved method and apparatus for securing relief photographic images and which, in its broad aspects, includes traverse scanning of the full aperture of a camera lens while effecting unidirectional relative motion between the camera and the subject at a predetermined rate relative to said scanning traverse of said aperture.

Among the advantages of the subject construction is the provision of a simple and relatively inexpensive construction for securing relief photographic images that does not require the film to be tilted out of its focal plane and which is capable of selectively producing a wide, but readily controllable, variation in the amount or degree of relief effect desired.

The object of this invention is the provision of an improved method and apparatus for securing relief photographs.

Other objects and advantages of this invention will be apparent from the following portions of this specification and from the accompanying drawings which illustrate the principles of this invention as incorporated in exemplary presently preferred embodiments thereof.

Referring to the drawings.

In its broad aspects, the subject construction normally employs a camera incorporating a single large lens having a relatively large aperture, an image receptor assembly including a photosensitive film and an associated multielement lens overlay and a scanning shutter assembly adapted to unidirectionally traverse the full aperture of the camera lens together with associated means for effecting relative motion between the subject and the camera while the lens aperture is being traversed by the scanning shutter.

Figure 1:
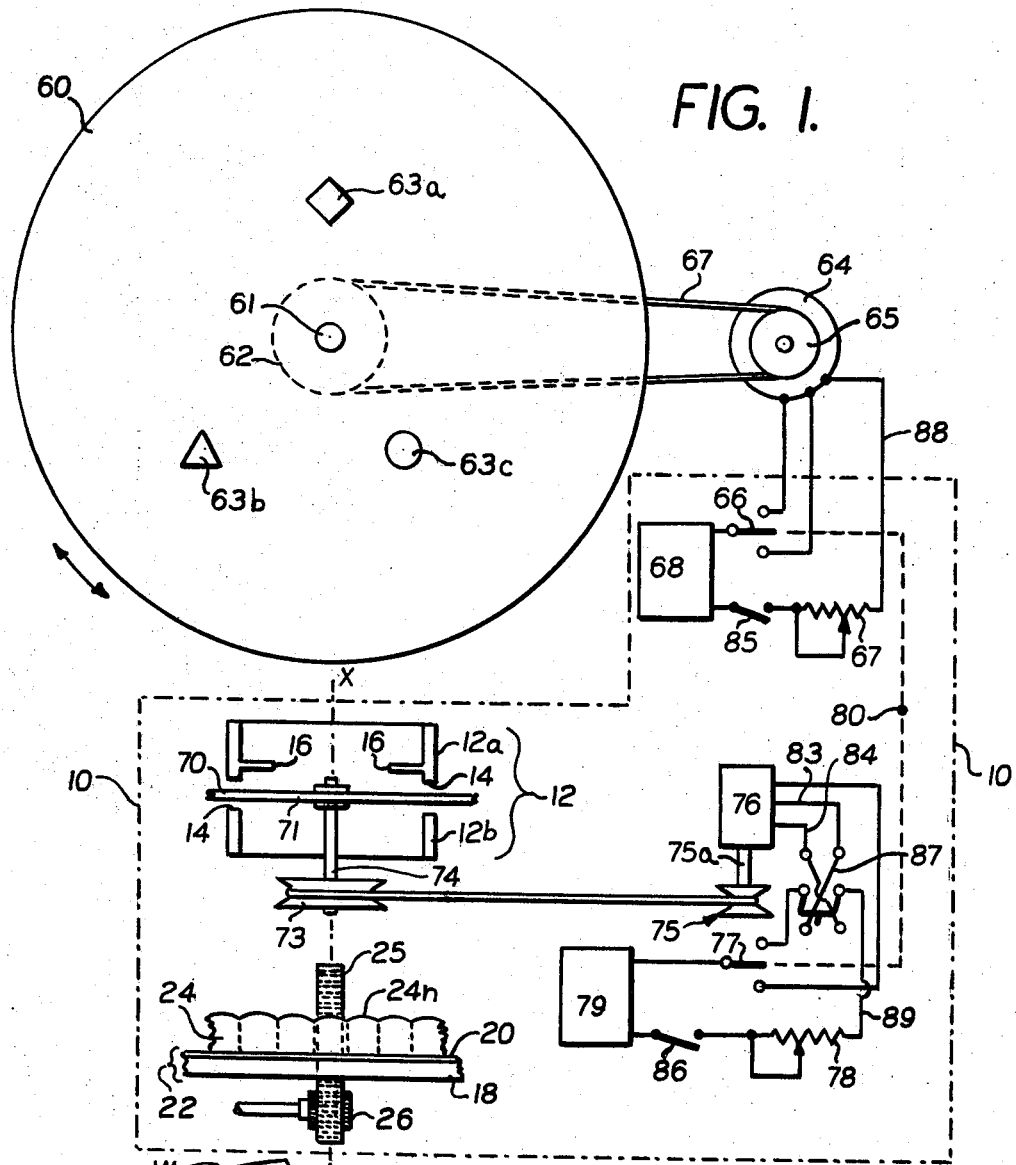
FIG. 1 is a schematic representation of apparatus elements utilizable in the securing of relief photographic images in accordance with the method of this invention.

Referring now to FIG. 1 there is provided a fixedly locatable camera housing, generally designated by the dotted lines 10, containing a large aperture lens assembly 12 divided into a front section 12a and a rear section 12b by a slot 14 sized to accommodate a rotatable shutter disc 70 in close proximity to a relatively narrow horizontal rectangular aperture 16 of the lens 12. As will be apparent to those skilled in this art the lens assembly 12 is only schematically represented and both the front and rear sections 12a and 12b thereof will, in practice, be constituted by one or more lenses of a character dictated by the usual photographic lens design considerations.

Figure 2:
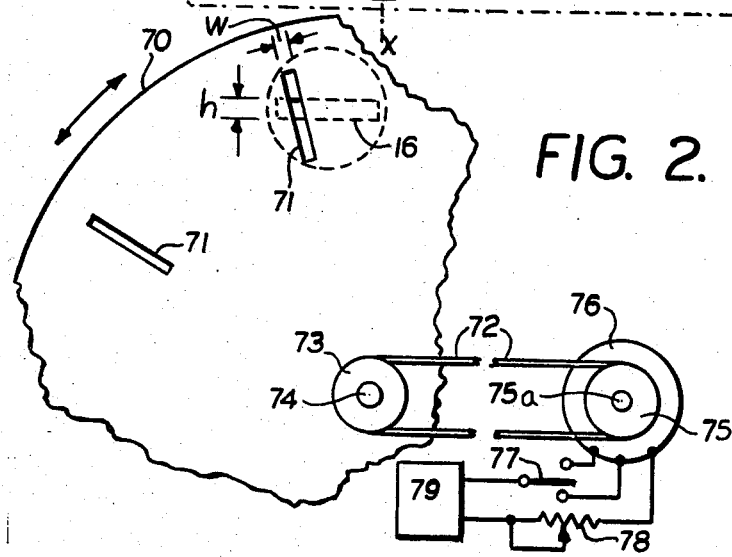
FIG. 2 is a schematic representation of the elements of a scanning shutter system includable in the apparatus of FIG. 1 and as seen from a different view.

As best shown in FIG. 2, the shutter disc 70 is provided with one or more radially disposed slots 71 so located as to traverse and thereby scan the aperture 16 as the disc 70 is rotated in either direction. The height $h$ of aperture 16 and the width $w$ of slot 71 are preferably approximately equal in size so as to provide a substantially equal vertical and horizontal depth of focus in the overall photograph to be taken. As shown, the shutter disc 70 may be rotated as desired in either direction to scan the aperture by means of a resettable spring drive mechanism (not shown) or by means of a drive belt 72 engaged with pulley 73 mounted on the disc shaft 74, and with a drive pulley 75 mounted on the drive shaft 75a of a reversible motor 76. In such a unit, direction of rotation of motor 76 is conveniently controlled by mans of a reversing switch 77 and its speed may be varied by a rheostat 78 in series with power source 79, or by other suitable means known to those skilled in the art.

Disposed remote from the lens assembly 12 and beyond the focal plane thereof is a backing plate 18 whose inwardly facing surface is disposed perpendicular to the optical axis x-x of the lens assembly 12 and serves to support a photosensitive film 22 having its emulsion surface 20 facing the lens 12. Disposed in adjacent overlying relationship with the emulsion surface 20 of the film 22 is the optically flat undersurface of a cylindrical lens overlay 24. The upper surface of a cylindrical lens overlay 24 constitutes an array of optically smooth small cylindrical lenses 24n locatable at the focal plane of the lens assembly 12 and each of which functions to form an image of the aperture 16 on the emulsion 20. The subassembly comprising the backing plate 18, film 22 and cylindrical lens overlay 24 are desirably mounted for conjoint movement longitudinally along the optical axis x-x as, for example, by means of rack 25 and pinion 26, for focusing purposes.

Positionable in spaced relation with the aforesaid camera, is a photographic subject supporting turntable 60 having one or more subjects to be photographed, such as, for example, three dimensional objects 63a, 63b and 63c positioned thereon. Table 60 is suitably mounted on a vertical shaft 61 and is adapted to be rotatably driven by a motor 64 through pulley 65, drive belt 67 and pulley 62 attached to shaft 61. The direction of rotation and speed of motor 64 is suitably controlled by means of reversing switch 66 and rheostat 67 connected intermediate the motor 64 and a source of power 68.

As will now be apparent, the illustrated arrangement provides for the selective operation of motors 64 and 76 either alone or in combination. For example, switch 66 may be operated independently to move photographic subjects 63a, 63b and 63c to a desired position for the starting of the taking of three dimensional or relief photographs. Also, switches 66 and 77 may be operated simultaneously by means of a common operator 80 mechanically linked thereto. Likewise, if table 60 is not to be rotated, the switch 85 in series with conductor 88 can be opened to prevent operation of table drive motor 64, and if the shutter disc 70 is not to be rotated the switch 86 in series with conductor 89 can be opened to prevent operation of shutter drive motor 76. If, on the other hand, it is desired to rotate shutter disc 70 in a reverse direction while table 60 continues to operate in the given direction the double-pole double-throw reversing switch 87 may be moved to its opposite position, which effectively reverses motor connections 83 and 84 of the shutter disc drive motor 76.

The described system thus provides a high degree of flexibility in that it permits the turntable 60 and shutter disc 70 to be moved to any desired angle at a selected rate over a wide range thereof by adjustment of rheostats 67 and 28; and permits the elements 60 and 70 to be selectively rotated either singly or conjointly in either direction.

In the operation of the described system, the securing of normal three dimensional images will be effected when the front side of turntable 60 is displaced at an angular velocity that is substantially greater than the angular velocity of the scanning disc aperture 71 each motion relative to the center of table 60. By a "normal" three dimensional image is meant an image which exhibits true three dimensional effects when viewed through a single cylindrical lens overlay substantially identical with overlay 24. That is, an image which, when the viewer's head is moved to the right, increasingly reveals the right side of the photographed subject (relative to the viewer) in contradistinction to an "abnormal" image which would increasingly reveal the left side of the photographed subject as the viewer's head is moved to the right.

Normally, the turntable controls and camera controls will be incorporated as part of the overall camera assembly 10 or, if desired, in a separate control package conveniently located relative to the turntable and the camera.

Omnidirectional three dimensional or relief effects can be obtained in a system of the type described above by utilizing a spherical lens overlay in lieu of the heretofore mentioned cylindrical lens overlay 24 and by vertically moving the rectangular aperture 16 by an amount equal to the width of slot 16 relating to the aperture of lens 12 intermediate each traverse of scanning slot 71 thereby. By such expedient the lens aperture will be scanned in the manner of a Nipkow disc. To obtain a normal three dimensional image, the effective Nipkow scanning aperture must move at a slower angular rate than the camera or turntable, as previously described for cylindrical lens overlays.

Alternatively, the subject supporting turntable 60 may also be both rotated and tilted relative to the camera assembly. In practical operation of the unit, any scanning pattern may be used that serves to expose the subject over a solid angle rather than a plane angle while the camera lens aperture follows the same pattern at a slower rate and provided that each angular element within the solid angle receives the same degree of exposure. Thus, as the lens aperture is scanned there must be a corresponding relative angular motion between camera assembly and turntable 60 in the same direction but at a greater angular rate until a solid angle is scanned symmetrically about axis x-x of lens 12.

It should also now be clear to those skilled in this art that the necessary relative motion between camera and subject may also be achieved by placement of the camera on a moveable platform, as for example, near the periphery of the turntable and fixedly locating the subject as for example, upon a fixed platform disposed over the center of rotation of the turntable and about which the camera will rotate. Additionally, the camera 10 may be displaced along a predetermined straight or curved path, as by mounting on a moveable platform, relative to a fixed subject during exposure as effected by displacement of the scanning slot 71 as heretofore described.

As will now be apparent, one of the principal advantages of the disclosed camera and turntable system is that the degree of three dimensional effect can be made increasingly greater merely by scanning the camera lens aperture with increasingly larger relative motions between camera and subject-supporting turntable, thus obtaining the effect of but obviating the use of lenses of very large size and prohibitive expense attendant the same. Other principal advantages are that the film and adjacent auxiliary lens array always remain in the focal plane, that these components do not require relative motion between them, and that normal three dimensional or relief images may readily be obtained when the motion of the subject relative to a fixed base is faster than that of the shutter-scanning aperture relative to the same fixed base to which the camera lens, film and auxiliary lens array are attached.

I claim:

1. Apparatus for the taking of normal image relief photographs, comprising:
    a fixedly positioned camera assembly having a relatively large lens and a photosensitive film surmounted by an adjacent multielement lens overlay disposed in adjustably positionable spaced relation therewith;
    displaceable means for supporting a subject to be photographed in predetermined positional relation with said camera assembly;
    means for effecting selectively directed uniform unidirectional displacement of said displaceable subject supporting means at predetermined settable speeds for selectively displacing a subject to be photographed with respect to said fixed camera;
    said camera assembly including means defining a first fixed elongate lens aperture and means defining a second elongate lens aperture disposed substantially perpendicular therewith and rotatably displaceable relative to said first fixed elongate lens aperture to progressively traverse the length thereof for defining a composite lens aperture of progressively varying location relative to the multielement lens overlay and the subject to be photographed; and
    means for controllably displacing a discrete portion of the full lens aperture of said fixed camera in a direction substantially parallel and concurrent to the direction of subject displacement and a selected rate of displacement substantially less than the rate of displacement of said subject by selectively displacing said displaceable second elongate lens aperture defining means relative to said first elongate lens aperture defining means.